No. 677,669. Patented July 2, 1901.
C. H. KOYL.
APPARATUS FOR SOFTENING AND PURIFYING WATER.
(Application filed Feb. 11, 1901.)
(No Model.) 2 Sheets—Sheet 1.
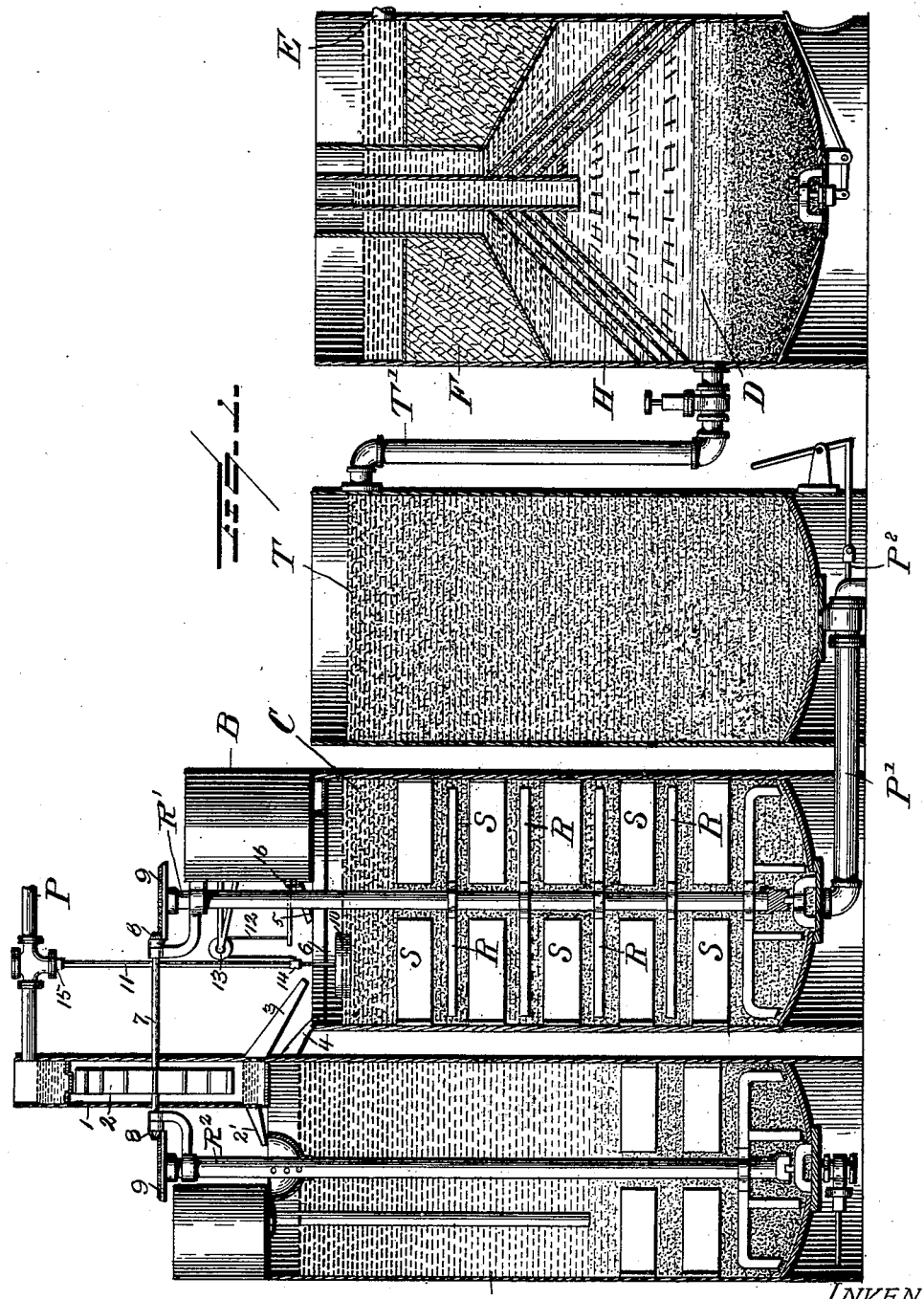
WITNESSES:
INVENTOR

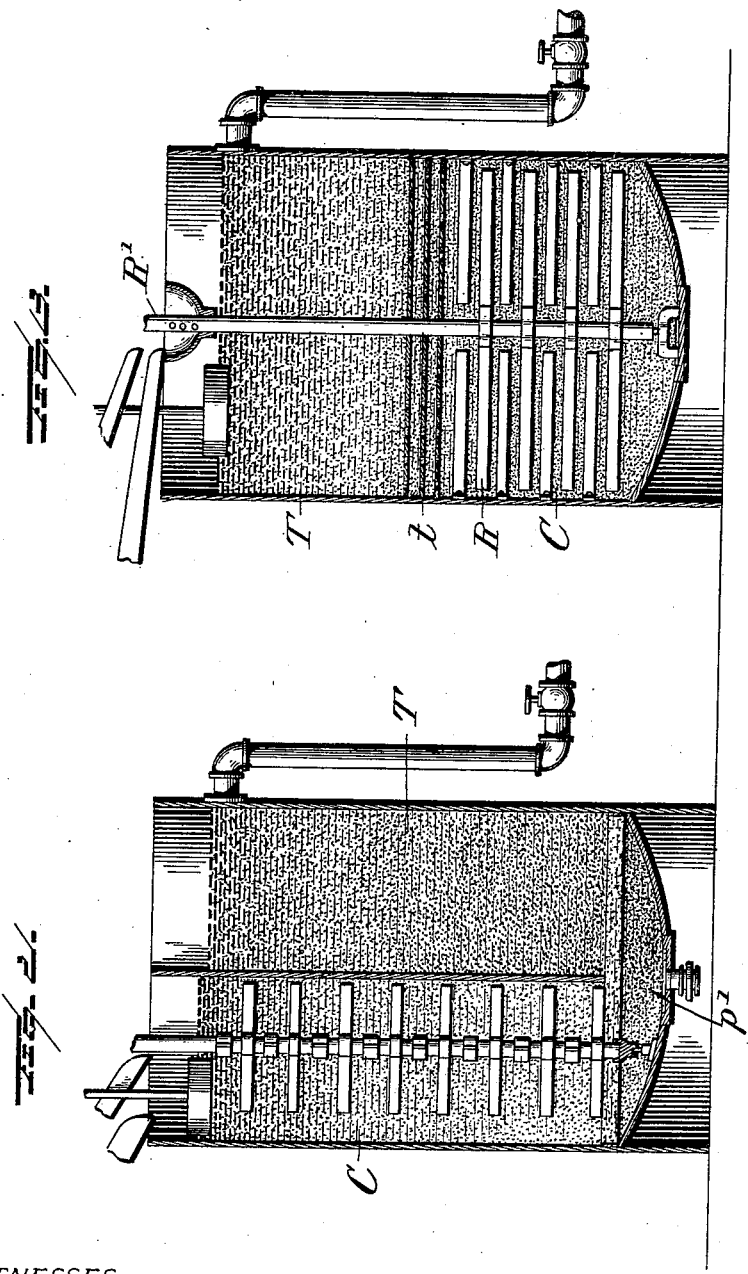

UNITED STATES PATENT OFFICE.

CHARLES HERSCHEL KOYL, OF NEW YORK, N. Y.

APPARATUS FOR SOFTENING AND PURIFYING WATER.

SPECIFICATION forming part of Letters Patent No. 677,669, dated July 2, 1901.

Application filed February 11, 1901. Serial No. 46,834. (No model.)

*To all whom it may concern:*

Be it known that I, CHARLES HERSCHEL KOYL, a citizen of the United States, and a resident of New York, in the county and State of New York, have invented a certain new and useful Improvement in Apparatus for Softening and Purifying Water; and I hereby declare that the following is a full and exact description thereof, reference being made to the accompanying drawings.

In Letters Patent of the United States No. 653,011, issued to me July 3, 1900, I have shown the value of allowing or compelling the water from the reaction-tank of a water-softening machine bearing the fine freshly-formed precipitates to rise through a bed of old precipitate, which acts as a strainer to retain and to hold the new and fine precipitates. In that patent I have illustrated an apparatus in which the accumulated precipitate of the settling-tank is used for this purpose, the water from the reaction-tank being compelled to enter at the bottom of the settling-tank and to rise through this bed of precipitate. One of the beneficial results of carrying this expedient into practice is that I am able to use settling-tanks of very much less size and capacity than would otherwise be possible. In the practice of my said patented invention the beneficial effect is increased as the mass of the old precipitate is increased; but I am unable to obtain in the coned bottom of the settling-tank sufficient depth to get from the precipitate which can be contained therein all the benefit that would be derived if the mass of precipitate were greater and could therefore act longer in its straining and agglomerating action upon the water from the reaction-tank with its young precipitate in suspension. It is unwise to allow precipitate to accumulate in the settling-tank to any great extent, because of the possibility of its being carried up into the filter through which the soft water passes on its way to the soft-water outlet in the settling-tank. With a view, therefore, to obtain the full benefit of the action of the old precipitate upon the water containing the finely-divided precipitate I interpose between the reaction-tank and the settling-tank an independent straining and agglomerating tank, through which the water passes on its way to the settling-tank from the reaction-tank and in which the mass of precipitate may be allowed to accumulate indefinitely. I have found it generally unnecessary to discharge the precipitate from this tank, because as the water is continuously in circulation upward through it a point is finally reached at which the water can hold in suspension no more precipitate, and after that the water flowing out of the top of this tank on its way to the settling-tank regularly carries over with it as much precipitate (agglomerated) as is brought (finely divided) into the bottom of this tank by the water fresh from the reaction-tank. In this way not only is the water effectively stripped of its precipitate, but I am enabled to still further reduce the dimensions of the settling-tank.

In the accompanying drawings, to which I shall now refer for a more complete understanding of my invention, Figure 1 shows in vertical section an apparatus embodying my invention in its preferred form. Figs. 2 and 3 are vertical sections of modifications in which the reaction and agglomerating tanks are contained within one exterior shell or casing.

A is a tank for solution and supply of lime or other slightly-soluble chemical. B is the tank for the solution and supply of sal-soda or other easily-soluble chemical. C is a reaction-tank to which are fed the raw water and reagents in definite amounts and within which these reagents are mixed with and act upon the water to produce precipitates of the material which it is desired to take out of the water, baffle-plates S and rotating stirrers R being provided to facilitate the mixing operation. D is the settling-tank, having at the top a filter-bed F and soft-water outlet E and below the filter-bed a series of superposed slitted or perforated settling-cones H. P is the supply-pipe for the raw water to be treated. All of these parts thus far described are substantially the same as the like lettered parts in my aforesaid Letters Patent No. 653,011 and are provided, as shown, with similar appliances for actuating the stirrers and regulating the feed of the raw water and the reagents. A detailed description of these parts is therefore unnecessary, further than to say that 1 is the box containing the water-wheel 2, driven by the raw water from pipe P. 2' is the spout from box 1 to the hollow shaft R² of the lime-tank A. 3 is the spout from the box 1 to tank C; and 4 is the spout from tank A to tank C, spouts 3 4 discharging into a pan 6, into which also discharges spout 5 from tank B, the water from pan 6 mixed with the chemicals passing into the reaction-tank C. 7 is the shaft actuated by wheel 2 and rotating through gearing 8 9 shafts R² R', and 10 is a float which through connections 11 12 13 14 controls valve 15 of pipe P and valve 16 of spout 5.

I come now to that feature of the apparatus in which my present invention is comprised.

Interposed between the reaction-tank and the settling-tank is the tank T, which I have hereinbefore designated as the "agglomerating-tank." The bottom of this tank is connected to the bottom of the reaction-tank by a pipe P', through which the treated water carrying the freshly-formed and finely-divided precipitate passes from the reaction-tank into the agglomerating-tank. A valve at P² may be provided for opening or closing this pipe when desired for any purpose—as, for instance, when it becomes necessary to empty and clean or repair the interior of either one of the two tanks—although, as above said, in the normal operation of the apparatus it is unnecessary to use the valve. From the top of the agglomerating-tank leads a pipe t', which opens into the settling-tank D at any suitable point in the lower portion of the latter. The tank T is supposed to be filled practically up to the outlet T' with old and agglomerated precipitate in suspension. When the water from the reaction-tank rises through this mass of old precipitate, it is stripped of its freshly-formed precipitate by the time it reaches the outlet T', the finely-divided particles of this precipitate remaining in the tank T and becoming so agglomerated or bound together that all the particles which as the mass of precipitate accumulates are carried over with the water through the outlet T' into the settling-tank are of considerable size and fall to the bottom of the settling-tank with great rapidity, thus leaving the water clear and avoiding any danger of clogging the filter.

The mass of precipitate which gathers at the bottom of the settling-tank and which represents the overflow from the agglomerating-tank due to the addition of freshly-formed precipitate from the reaction-tank can be drawn off daily or as often as desired from the settling-tank.

The apparatus thus organized is highly effective, and the presence of the agglomerating-tank renders it feasible to make the settling-tank of much smaller dimensions than would otherwise be possible and also to reduce the number of settling-cones therein.

In lieu of having two separate structures for the reaction and agglomerating tanks I can, as shown in Fig. 2, place them both in one shell, which by a vertical partition is divided into the two tanks or chambers C T, which at their bottoms or lower ends communicate with each other through a passage p', or, as shown in Fig. 3, I can superpose the agglomerating-tank T upon the reaction-tank C, the two being divided by horizontal perforated partitions t or other suitable means which will afford communication between the two, while preventing the rotary currents of the reaction-tank from disturbing to any material extent the water of the superposed agglomerating-tank. In this construction the raw water and reagents may be fed to the reaction-tank through the hollow shaft R' of the stirrers R, as indicated in the figure.

Having described my invention and the best way now known to me of carrying the same into practical effect, what I claim herein as new, and desire to secure by Letters Patent, is as follows:

In apparatus for the continuous purification of water, a reaction-tank in which the water is chemically treated and the precipitates resulting from that treatment are formed, a settling-tank, and an interposed agglomerating-tank through which the water from the reaction-tank passes on its way to the settling-tank, having at its lower end an inlet communicating with the outlet of the reaction-tank and at its upper end an outlet communicating with the inlet of the settling-tank, substantially as and for the purposes hereinbefore set forth.

In testimony whereof I have hereunto set my hand this 4th day of February, 1901.

CHARLES HERSCHEL KOYL.

Witnesses:
HENRY BEYER,
H. H. SUTRO.